United States Patent
Sinha et al.

(10) Patent No.: US 11,031,615 B2
(45) Date of Patent: Jun. 8, 2021

(54) METHOD OF OPERATING A FUEL CELL STACK HAVING A TEMPORARILY DISABLED DRAIN VALVE

(71) Applicant: GM Global Technology Operations LLC, Detroit, MI (US)

(72) Inventors: Manish Sinha, Rochester Hills, MI (US); Xiaofeng Wang, Troy, MI (US); Chad Dubois, Oxford, MI (US); Sergio E. Garcia, Commerce Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 306 days.

(21) Appl. No.: 16/001,425

(22) Filed: Jun. 6, 2018

(65) Prior Publication Data
US 2019/0379075 A1     Dec. 12, 2019

(51) Int. Cl.
*H01M 8/04* (2016.01)
*H01M 8/04828* (2016.01)
*H01M 8/04746* (2016.01)
*H01M 8/04119* (2016.01)
*H01M 8/0432* (2016.01)

(52) U.S. Cl.
CPC ..... *H01M 8/04843* (2013.01); *H01M 8/0485* (2013.01); *H01M 8/04156* (2013.01); *H01M 8/04358* (2013.01); *H01M 8/04753* (2013.01); *H01M 8/04761* (2013.01)

(58) Field of Classification Search
CPC ......... H01M 8/04179; H01M 8/04843; H01M 8/04156; H01M 8/0485; H01M 8/04358; H01M 8/04753; H01M 8/04104; H01M 8/04302; H01M 8/04225; H01M 8/04761; H01M 8/04701; H01M 8/0491; H01M 8/0494; H01M 8/04291; H01M 8/04835; H01M 8/04783; H01M 8/04492; H01M 8/04253; H01M 2008/1095; H01M 2250/20
See application file for complete search history.

(56) References Cited

U.S. PATENT DOCUMENTS 9,034,530 B2    5/2015  Lebzelter et al.
2012/0171590 A1* 7/2012 Matsumoto ....... H01M 8/04388
                                                          429/442

* cited by examiner

*Primary Examiner* — Stephen J Yanchuk
(74) *Attorney, Agent, or Firm* — Quinn IP Law

(57) ABSTRACT

A method of operating a fuel cell stack is described. The fuel cell stack includes a cathode, an anode, a sump configured for collecting water from the anode, and a temporarily disabled drain valve that is otherwise configured to transition from a first position to a second position and thereby modulate water drained from the sump. The method includes increasing a first pressure in the anode via a controller. The method also includes, concurrent to increasing, decreasing a second pressure in the cathode via the controller and, concurrent to decreasing, maintaining a relative humidity of less than a threshold relative humidity in the cathode via the controller.

14 Claims, 3 Drawing Sheets

METHOD OF OPERATING A FUEL CELL STACK HAVING A TEMPORARILY DISABLED DRAIN VALVE

INTRODUCTION

The disclosure relates to a method of operating a fuel cell stack, and to a system and a device that include the fuel cell stack.

A fuel cell is an electro-chemical device that generally includes an anode, a cathode, and an electrolyte disposed between the anode and the cathode. During operation of the fuel cell, hydrogen gas may enter the anode and oxygen or air may enter the cathode. The hydrogen gas may dissociate in the anode to generate free hydrogen protons and electrons. The hydrogen protons may then pass through the electrolyte to the cathode, and react with oxygen and electrons in the cathode to generate water. Further, the electrons from the anode may not pass through the electrolyte but may instead be directed through a load to perform work. As such, several fuel cells may be combined to form a fuel cell stack to generate a desired fuel cell stack power output. For example, a fuel cell stack for a vehicle may include many stacked fuel cells.

One type of fuel cell stack, a polymer electrolyte membrane fuel cell stack (PEMFC), may operate to produce water and air as a byproduct during operation, and the water may be collected in a sump. Therefore, the fuel cell stack may also include a drain valve to purge or drain the water from the sump and prevent excessive buildup of water in the fuel cell stack.

SUMMARY

A fuel cell stack includes a cathode, an anode, a sump configured for collecting water from the anode, and a temporarily disabled drain valve that is otherwise configured to transition from a first position to a second position and thereby modulate water drained from the sump. The method includes increasing a first pressure in the anode via a controller. The method also includes, concurrent to increasing, decreasing a second pressure in the cathode via the controller and, concurrent to decreasing, maintaining a relative humidity of less than a threshold relative humidity in the cathode via the controller.

Maintaining may include minimizing an amount of water collected by the sump.

In one aspect, the fuel cell stack may further include a polymer electrolyte membrane disposed between the cathode and the anode. In addition, the anode and the cathode may each include a gas diffusion layer. Maintaining may further include filling the polymer electrolyte membrane and the gas diffusion layer with water before adding water to the sump.

Increasing may include setting the first pressure to greater than the second pressure to thereby reduce a flow of water from the cathode to the anode. The method may further include, prior to increasing, detecting via the controller that the temporarily disabled drain valve is disposed in the first position and cannot transition to the second position.

Concurrent to decreasing, the method may include producing and sustaining a fuel cell stack power output sufficient to power a device for at least a predetermined duration while the temporarily disabled drain valve is disposed in the first position.

The method may further include warming the temporarily disabled drain valve to thereby transition the temporarily disabled drain valve from the first position to the second position.

In another aspect, the method may further include, prior to increasing, measuring a coolant inlet temperature via at least one temperature sensor. The method may also include comparing the coolant inlet temperature to a first threshold temperature via a processor to define: a first condition in which the coolant inlet temperature is less than the first threshold temperature; or a second condition in which the coolant inlet temperature is greater than or equal to the first threshold temperature. After comparing, the method may include detecting via the controller that the temporarily disabled drain valve is disposed in the first position.

The method may further comprise, for the first condition, comparing the coolant inlet temperature to a second threshold temperature via the processor to define: a third condition in which the coolant inlet temperature is less than the second threshold temperature or a fourth condition in which the coolant inlet temperature is greater than or equal to the second threshold temperature.

In addition, the method may further include, for the third condition, reducing at least one of a fuel cell stack warmup rate and a fuel cell stack current density. Reducing may include lowering a flow of water from the cathode to the anode. Further, reducing the fuel cell stack current density may include increasing a fuel cell stack temperature while maintaining the relative humidity of less than a threshold relative humidity via the controller.

In a further aspect, the fuel cell stack may further include an anode water separator disposed within the anode. The method may further include, subsequent to detecting, comparing a water level in the anode water separator to a threshold water level to define: a fifth condition in which the water level is greater than the threshold water level or a sixth condition in which the water level is less than or equal to the threshold water level. For the fifth condition, the method may include decreasing a fuel cell stack power output. For the sixth condition, the method may include maintaining the fuel cell stack power output.

In another aspect, the method may include, for the first condition and subsequent to decreasing the fuel cell stack current density, comparing the coolant inlet temperature to a third threshold temperature via the processor to define: a seventh condition in which the coolant inlet temperature is greater than the third threshold temperature, or an eighth condition in which the coolant inlet temperature is less than or equal to the third threshold temperature. For the seventh condition, the method may include evaluating whether: the relative humidity is less than the threshold relative humidity or the fuel cell stack warmup rate is greater than a threshold warmup rate. For the eighth condition, the method may include detecting via the controller that the temporarily disabled drain valve is disposed in the first position.

The method may also include, for the second condition, if the temporarily disabled drain valve is disposed in the first position, determining whether the fuel cell stack has reached a fully-warmed state.

A system includes a fuel cell stack including a cathode, an anode, a sump configured for collecting water from the anode, and a temporarily disabled drain valve that is otherwise configured to transition from a first position to a second position and thereby modulate water drained from the sump. The system also includes an electric machine electrically connected to and powered by the fuel cell stack. The system further includes a controller in communication with the fuel cell stack, having a processor, and configured to maintain operation of the fuel cell stack when the temporarily disabled drain valve is disposed in the first position via execution of instructions by the processor. Execution of the instructions causes the controller to concurrently increase a first pressure in the anode, decrease a second pressure in the cathode, and maintain a relative humidity of less than a threshold relative humidity in the cathode.

In one aspect, the controller may be configured to decrease at least one of a fuel cell stack warmup rate and a fuel cell stack current density to thereby slow a flow of water from the cathode to the sump.

Further, the controller may be configured to increase a fuel cell stack temperature while maintaining the relative humidity of less than the threshold relative humidity at any fuel cell stack current density.

A device includes a set of drive wheels and a fuel cell stack. The fuel cell stack includes a cathode, an anode, a sump configured for collecting water from the anode, and a temporarily disabled drain valve that is otherwise configured to transition from a first position to a second position and thereby modulate water drained from the sump. The device also includes an electric traction motor electrically connected to and powered by the fuel cell stack, wherein the electric traction motor has an output member coupled to the set of drive wheels. In addition, the device includes a controller in communication with the fuel cell stack, having a processor, and configured to maintain operation of the fuel cell stack when the temporarily disabled drain valve is disposed in the first position via execution of instructions by the processor. Execution of the instructions causes the controller to concurrently increase a first pressure in the anode, decrease a second pressure in the cathode, and maintain a relative humidity of less than the threshold relative humidity in the cathode.

In addition, the fuel cell stack may power the set of drive wheels for a predetermined duration while the temporarily disabled drain valve is disposed in the first position.

DETAILED DESCRIPTION

Figure 1:
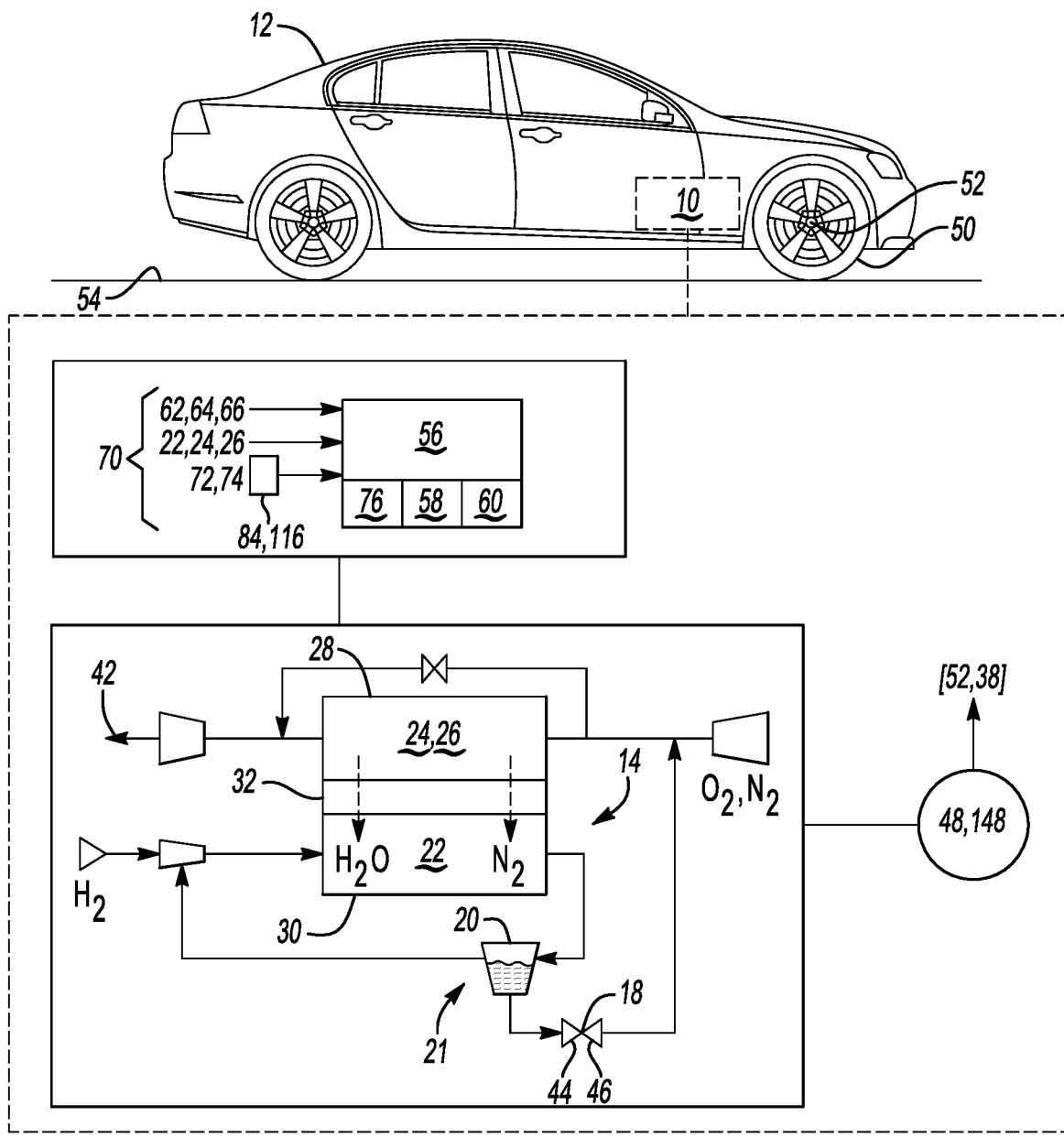
FIG. 1 is a schematic illustration of a side view of a device having a fuel cell stack and a controller in communication with the fuel cell stack.

Referring to the Figures, wherein like reference numerals refer to like elements, a system 10 and device 12 including a fuel cell stack 14 are shown generally in FIG. 1. Further, a method 16 of operating the fuel cell stack 14 is shown generally in FIG. 3. In particular, and as set forth in more detail below, the method 16 may be useful for operating fuel cell stacks 14 that include a temporarily disabled drain valve 18 (FIG. 1), e.g., a stuck, frozen, blocked, fouled, mechanically malfunctioning, or electrically malfunctioning drain valve 18. As such, the method 16 may be useful for maintaining operation of the fuel cell stack 14 even while the temporarily disabled drain valve 18 is malfunctioning. Therefore, for example, the method 16, system 10, and device 12 may be particularly suitable for applications in which the fuel cell stack 14 starts up and/or operates at below freezing temperatures such that water present at the drain valve 18 freezes and prevents normal operation of the temporarily disabled drain valve 18.

As such, the method 16, system 10, and device 12 may be useful for vehicular applications such as, but not limited to, automobiles, buses, forklifts, motorcycles, bicycles, trains, trams, spacecraft, airplanes, farming equipment, boats, and submarines. Alternatively, the method 16, system 10, and device 12 may be useful for non-vehicular applications such as stationary power generation, portable power generation, electronics, remote weather stations, communications centers, research stations, and the like. More specifically, by way of a non-limiting example, the method 16, system 10, and device 12 may be useful for polymer electrolyte membrane fuel cell applications for non-autonomous, autonomous, or semi-autonomous vehicle applications (shown generally at in FIG. 1) in which the fuel cell stack 14 is subjected to below freezing temperatures at start-up 200 (FIG. 4) or during continued operation. For example, the method 16 may be useful for operating a fuel cell stack 14 in a device 12 such as a vehicle that has been parked for a long period in freezing temperatures and yet now requires an immediate start and drivability.

As described in further detail below, the method 16 prevents a flow of water ($H_2O$) to and/or a buildup of water ($H_2O$) at the temporarily disabled drain valve 18 until the temporarily disabled drain valve 18 can recover nominal functionality and again operate to drain water ($H_2O$) from a sump 20 of the fuel cell stack 14. In particular, the method 16 manipulates pressures 22, 24 and relative humidity 26 within the fuel cell stack 14 to modulate water ($H_2O$) flow to the sump 20 and temporarily disabled drain valve 18 until the drain valve 18 is no longer disabled and functions as intended to drain water ($H_2O$) from the fuel cell stack 14.

Figure 2:
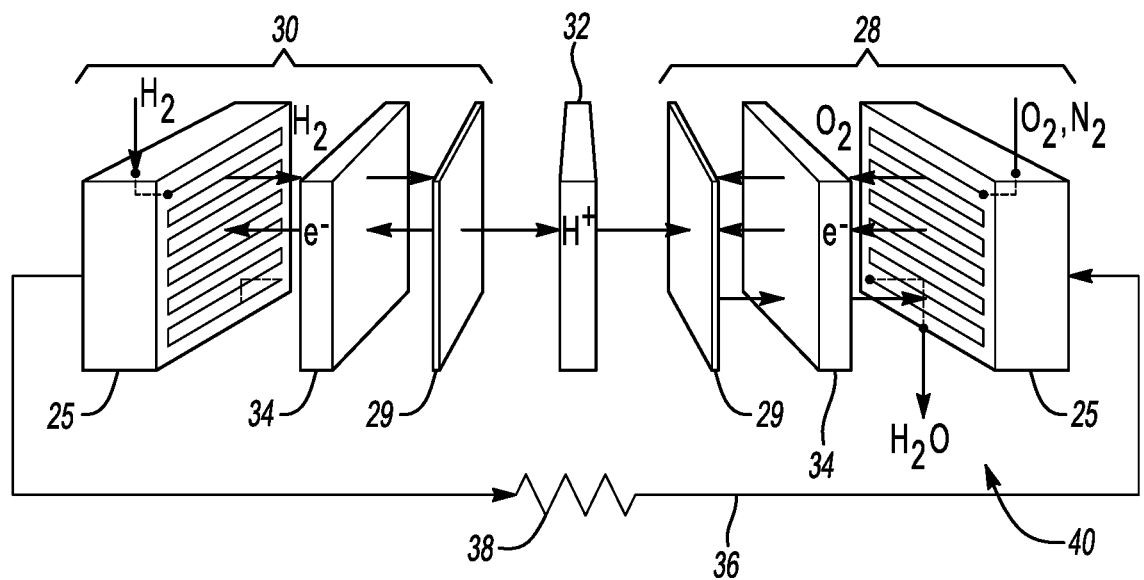
FIG. 2 is a schematic illustration of an exploded view of the fuel cell stack of FIG. 1.

More specifically, as described with reference to FIGS. 1 and 2, the fuel cell stack 14 includes a cathode 28, an anode 30, and an electrolyte 32, e.g., a polymer electrolyte membrane, disposed between the cathode 28 and the anode 30. Further, the fuel cell stack 14 includes the sump 20 (FIG. 1) that is configured for collecting water ($H_2O$) from the anode 30. As shown in greater detail in FIG. 2, the fuel cell stack 14 may be formed from one or more membrane electrode assemblies (MEA) that include the cathode 28, anode 30, electrolyte 32; a plurality of flow plates 25; a catalyst 29; and a plurality of gas diffusion layers 34.

During operation of the fuel cell stack 14, chemical energy from an electrochemical reaction of hydrogen ($H_2$) and oxygen ($O_2$) may transform to electrical energy. In particular, hydrogen gas ($H_2$) may enter the anode 30 and be catalytically split into protons ($H^+$) and electrons ($e^-$) at the catalyst 29 of the anode 30. The protons ($H^+$) may permeate through the polymer electrolyte membrane 32 to the cathode 28, while the electrons ($e^-$) may not permeate the polymer electrolyte membrane 32 but may instead travel along an external load circuit 36 to the cathode 28 to produce a fuel cell stack power output 38 or electrical current. Concurrently, air, e.g., oxygen ($O_2$) and nitrogen ($N_2$), may enter the cathode 28, react with the protons ($H^+$) permeating through the polymer electrolyte membrane 32 and the electrons ($e^-$) arriving to the cathode 28 from the external load circuit 36, and form a byproduct 40, i.e., water ($H_2O$) and heat. The heat may be expelled through an exhaust 42 of the fuel cell stack 14. The water ($H_2O$) may travel through the polymer electrolyte membrane 32 to the anode 30 and may be collected in the sump 20.

Therefore, the fuel cell stack 14 also includes the temporarily disabled drain valve 18 that is otherwise configured to transition from a first position 44 to a second position 46 and thereby modulate water ($H_2O$) drained from the sump 20. In one embodiment, the first position 44 may be a closed position and the second position 46 may be an open position such that the temporarily disabled drain valve 18 is stuck closed. That is, the second position 46 may be a nominal operating state for the drain valve 18. Alternatively, the first position 44 may be an open position and the second position 46 may be a closed position such that the temporarily disabled drain valve 18 is stuck open.

For example, in one embodiment, during nominal operation of the drain valve 18, the drain valve 18 may transition from the first position 44 to the second position 46 to drain water ($H_2O$) from the sump 20. However, under some conditions, the temporarily disabled drain valve 18 may remain in the first position 44 and may not effectively drain water ($H_2O$) from the sump 20 of the fuel cell stack 14. For example, the temporarily disabled drain valve 18 may be stuck, frozen, clogged, blocked, or otherwise mechanically or electrically unable to drain water ($H_2O$) from the sump 20.

Alternatively, in another embodiment, during nominal operation of the drain valve 18, the drain valve 18 may transition from the first position 44 to the second position 46 to modulate, e.g., prevent, water ($H_2O$) drainage from the sump 20. However, for this embodiment, under some conditions, the temporarily disabled drain valve 18 may remain in the first position 44, e.g., may remain stuck open, and may not effectively restrict water ($H_2O$) drainage from the sump 20.

Referring again to FIG. 1, the system 10 and device 12 include the fuel cell stack 14 and an electric machine 48 electrically connected to and powered by the fuel cell stack 14. Suitable non-limiting examples of electric machines 48 may include permanent magnet direct current motors, alternating current motors, direct current generators, alternating current generators, Eddy current clutches, Eddy current brakes, rotary converters, hysteresis dynamometers, transformers, and the like. For example, the electric machine 48 may be an electric traction motor 148 for a device 12 having an at least partially-electric drivetrain. Motor torque generated by the electric machine 48 may be used to propel the device 12, e.g., a vehicle, start an internal combustion engine, and/or perform other high-voltage functions.

In a vehicle in particular, a given electric machine 48 may be configured as an electric traction motor 148 that outputs torque that ultimately propels the vehicle. That is, the device 12 may include a set of drive wheels 50 and the electric traction motor 148 may have an output member 52 coupled to the set of drive wheels 50. For example, the electric machine 48 may be energized or powered by the fuel cell stack power output 38 produced during the above-described reaction of hydrogen ($H_2$) and oxygen ($O_2$) within the fuel cell stack 14 such that the energized electric machine 48 produces output torque via the output member 52.

In particular, by way of a non-limiting vehicular example, the output member 52 may be coupled to the set of drive wheels 50 of the device 12, e.g., via a planetary transmission or gear box (not shown). The generated output torque may be delivered to the set of drive wheels 50 while the set of drive wheels 50 is in rolling contact with a road surface 54 such that the electric machine 48 ultimately propels the device 12 or vehicle in some modes of operation.

For example, in "mild hybrid" or extended-range electric vehicle embodiments, the vehicle may have an internal combustion engine connected to the electric machine 48 via a belted drive arrangement, such that when the electric machine 48 is powered by the fuel cell stack 14, the electric machine 48 is operable for cranking and starting the engine, for regenerative braking, for other power generation, and the like. In particular, as set forth in more detail below, the fuel cell stack 14 may power the set of drive wheels 50 for a predetermined duration, e.g., at least 5 minutes or at least 15 minutes or at least 30 minutes or at least one hour, while the temporarily disabled drain valve 18 is disposed in the first position 44. That is, the method 16, system 10, and device 12 may allow continued operation of the fuel cell stack 14 for the predetermined or desired duration even while the drain valve 18 is frozen closed or otherwise temporarily disabled and stuck in the first position 44, i.e., even while water ($H_2O$) cannot drain from the sump 20 of the fuel cell stack 14 through the temporarily disabled drain valve 18. Further, although shown for simplicity in FIG. 1 as a single electric machine 48 configured as an electric traction motor 148, the system 10 and device 12 may also include a plurality of separate electric machines 48 each sized and configured for a respective task.

With continued reference to FIG. 1, the system 10 and device 12 also include a controller 56 in communication with the fuel cell stack 14, having a processor 58, and configured to maintain operation of the fuel cell stack 14 when the temporarily disabled drain valve 18 is disposed in the first position 44 via execution of instructions 60 by the processor 58. In particular, as set forth in more detail below, execution of the instructions 60 causes the controller 56 to concurrently increase a first pressure 22 in the anode 30, decrease a second pressure 24 in the cathode 28, and maintain the relative humidity 26 of less than a threshold relative humidity in the cathode 28. For example, the threshold relative humidity may be predetermined according to a humidity calibration model and may be less than 100%. That is, the threshold relative humidity may be less than or equal to 90% or less than or equal to 80% or less than or equal to 70% or less than or equal to 60%. For example, although again set forth in more detail below, the controller 56 may be configured to decrease at least one of a fuel cell stack warmup rate 62 (FIG. 4) and a fuel cell stack current density 64 (FIG. 4) to thereby slow a flow of water ($H_2O$) from the cathode 28 to the sump 20. Further, the controller 56 may be configured to increase a fuel cell stack temperature 66 (FIG. 4) while maintaining 68 (FIG. 3) the relative humidity 26 of less than the threshold relative humidity at any fuel cell stack current density 64.

Stated differently, the system 10 and device 12 may be regulated by the controller 56. As part of a regulating function, the controller 56 may be programmed with computer-readable instructions 60 embodying the method 16 for operating the fuel cell stack 14, and for therefore controlling an operation of the fuel cell stack 14 and/or the device 12 or vehicle using the fuel cell stack 14. Again, while a vehicular application is described with reference to FIG. 1, a wider range of possible fuel cell stack 14 applications may benefit from the described teachings, including power plants and mobile platforms, as well as other power generating equipment.

As part of the method 16, the controller 56 may be programmed to determine a set of input values (arrows 70) and, using the received input values (arrows 70), to control operation of the fuel cell stack 14, system 10, and/or device 12. As described below, the input values (arrows 70) may be relayed to the controller 56 by at least one temperature sensor, pressure sensor, flow sensor, water level model, level sensor, hydrogen concentration model, hydrogen concentration sensor, nitrogen concentration sensor, relative humidity sensor, electric current sensor, fuel cell stack power output sensor, and the like, and may include, e.g., the first pressure 22, the second pressure 24, the relative humidity 26 within the cathode 28, the fuel cell stack power output 38, a coolant inlet temperature 72, a hydrogen concentration in the anode 30, the fuel cell stack current density 64, the fuel cell stack warmup rate 62, a flow rate of water ($H_2O$), a fuel cell stack temperature 66, a water level 74, and the like.

In order to perform assigned functions, the controller 56 includes the processor 58 and may include memory 76. The memory 76 may include tangible, non-transitory memory, e.g., read only memory, whether optical, magnetic, flash, or otherwise. The controller 56 may also include sufficient amounts of random access memory, electrically-erasable programmable read only memory, and the like, as well as high-speed clock, analog-to-digital and digital-to-analog circuitry, and input/output circuitry, as well as appropriate signal conditioning and buffer circuitry.

Figure 3:
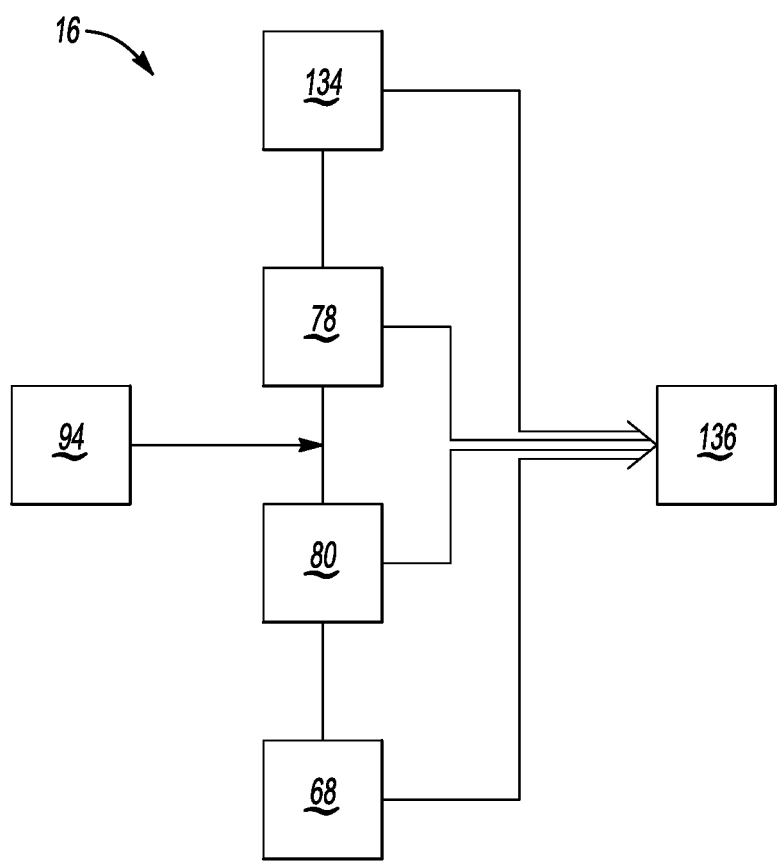
FIG. 3 is a flowchart of a method of operating the fuel cell stack of FIGS. 1 and 2.

Referring again to the method 16 as described with reference to FIGS. 1 and 3, the method 16 (FIG. 3) of operating the fuel cell stack 14 includes increasing 78 (FIG. 3) the first pressure 22 in the anode 30 via the controller 56; concurrent to increasing 78, decreasing 80 the second pressure 24 in the cathode 28 via the controller 56; and concurrent to decreasing 80, maintaining 68 the relative humidity 26 of less than the threshold relative humidity in the cathode 28 via the controller 56. That is, maintaining 68 may include minimizing an amount of water ($H_2O$) collected by the sump 20.

For example, maintaining 68 may include filling other components of the fuel cell stack 14 with water ($H_2O$) before adding water ($H_2O$) to the sump 20. In particular, as set forth above, the fuel cell stack 14 may include the polymer electrode membrane 32 disposed between the anode 30 and the cathode 28. In addition, the anode 30 and the cathode 28 may each include a gas diffusion layer 34 (FIG. 2) formed from a carbon paper or a carbon cloth. The plurality of gas diffusion layers 34 may be porous and may provide an electrically conductive pathway to collect electrical current, assist with heat and water ($H_2O$) removal from the fuel cell stack 14, and provide mechanical support to the membrane electrode assembly. Therefore, maintaining 68 may further include filling the polymer electrode membrane 32 and the gas diffusion layer 34 with water ($H_2O$) before adding water ($H_2O$) to the sump 20. That is, the method 16 may include first filling the soft goods of the fuel cell stack 14, e.g., the polymer electrode membrane 32 and the gas diffusion layers 34, with water ($H_2O$) before filling the sump 20.

In addition, increasing 78 may include setting the first pressure 22 to greater than the second pressure 24 to thereby reduce a flow of water ($H_2O$) from the cathode 28 to the anode 30. Conversely, decreasing 80 may include setting the second pressure 24 to less than the first pressure 22. That is, the method 16 may include controlling the first pressure 22 in the anode 30 and the second pressure 24 in the cathode 28 to reduce a partial pressure driving force between the cathode 28 and the anode 30 and thereby reduce a water ($H_2O$) permeation rate from the cathode 28 to the anode 30. For example, generally under nominal operating conditions, water ($H_2O$) may flow from the cathode 28 through the polymer electrolyte membrane 32 to the anode 30. However, when the temporarily disabled drain valve 18 is undesirably disposed in the first position 44 such that accumulating water ($H_2O$) cannot effectively drain from the fuel cell stack 14, the method 16 may include manipulating the first pressure 22 and the second pressure 24 to direct the flow of water ($H_2O$) from the anode 30 to the cathode 28 rather than from the cathode 28 to the anode 30.

Further, increasing 78 and decreasing 80 may also include equalizing the first pressure 22 and the second pressure 24 to thereby stop the flow of nitrogen ($N_2$) from the cathode 28 to the anode 30. That is, as the first pressure 22 and the second pressure 24 equalize, the method 16 may also include preventing the flow of nitrogen ($N_2$) from the cathode 28 to the anode 30. More specifically, as the first pressure 22 in the anode 30 increases and the second pressure 24 in the cathode 28 decreases, the nitrogen ($N_2$) permeation rate may slow and eventually cease due to both the above-described reduced partial pressure driving force and/or due to low temperature operation of the fuel cell stack 14.

Figure 4:
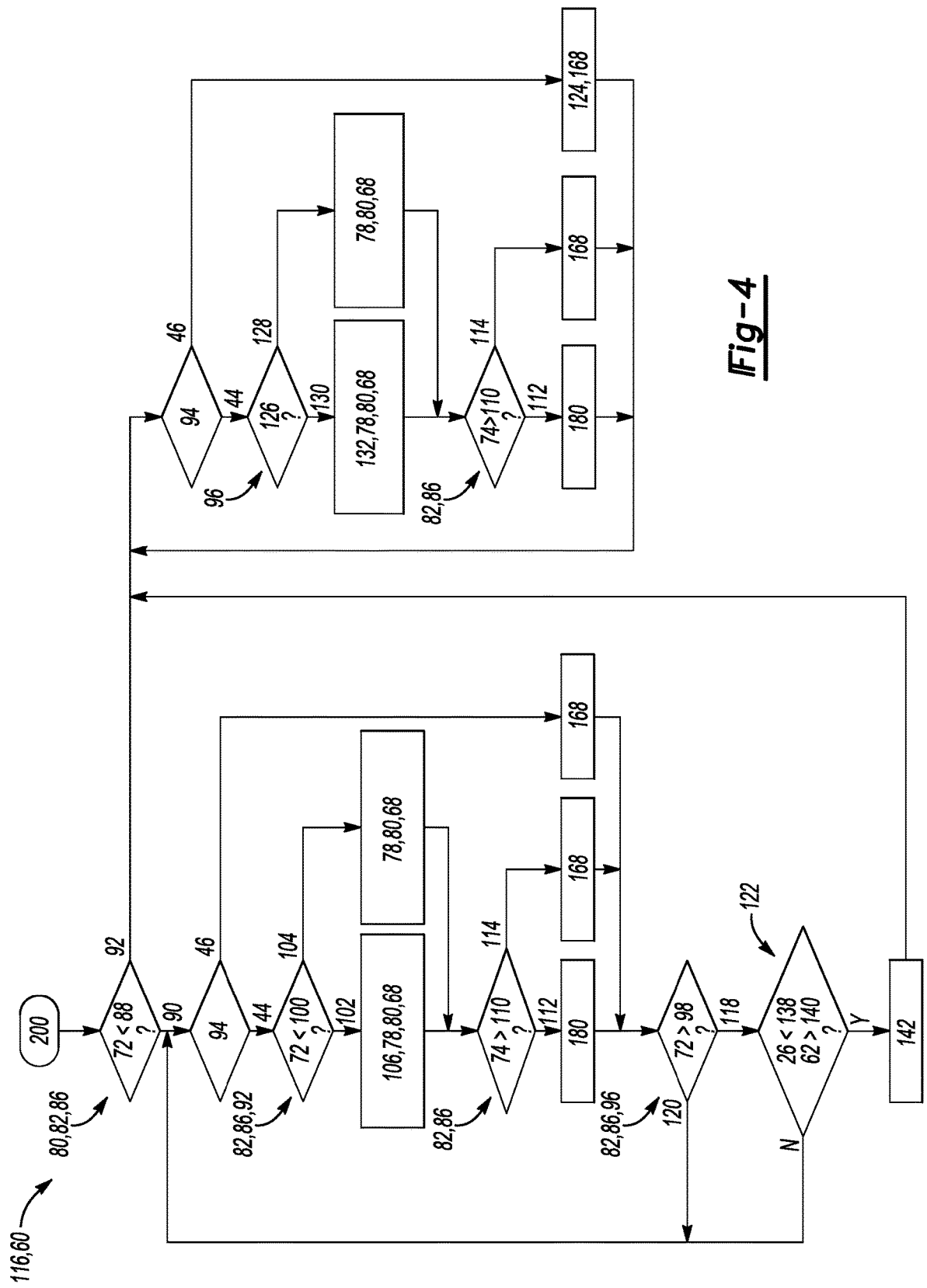
FIG. 4 is a flowchart of other aspects of the method of FIG. 3.

FIG. 4 illustrates in detail additional instructions 60 executable by the controller 56 and/or the processor 58 for increasing 78 the first pressure 22 while decreasing 80 the second pressure 24 and maintaining 68 the relative humidity 26 of less than the threshold relative humidity in the cathode 28.

That is, referring to FIG. 4, upon start-up (200) of the fuel cell stack 14, the method 16 may further include, prior to increasing 78 the first pressure 22, measuring 82 the coolant inlet temperature 72 via the at least one temperature sensor 84 (FIG. 1). The method 16 may also include comparing 86 the coolant inlet temperature 72 to a threshold temperature 88 via the processor 58 to define: a first condition 90 in which the coolant inlet temperature 72 is less than the threshold temperature 88, or a second condition 92 in which the coolant inlet temperature 72 is greater than or equal to the threshold temperature 88. The threshold temperature 88 may be determined by calibration of the fuel cell stack 14 and may represent a temperature at which the coolant may be warm enough to melt ice or to indicate that the fuel cell stack 14 is nearing nominal operation. Therefore, the method 16 may include determining whether the coolant inlet temperature 72 is greater than a given threshold temperature 88.

For the first condition 90 and for the second condition 92, the method 16 may include, after comparing 86, detecting 94 via the controller 56 that the temporarily disabled drain valve 18 is disposed in the first position 44. That is, the method 16 may include, prior to increasing 78, detecting 94 via the controller 56 that the temporarily disabled drain valve 18 is disposed in the first position 44 and cannot transition to the second position 46, i.e., that the drain valve 18 is in fact undesirably temporarily disabled and unable to drain water ($H_2O$) from the sump 20 of the fuel cell stack 14.

However, for the first condition 90, if the drain valve 18 is no longer temporarily disabled and is disposed in the second position 46, the method 16 may include setting or maintaining 168 the fuel cell stack power output 38 as required by the demand or use of the device 12 or system 10.

In addition, for the first condition 90, if the drain valve 18 is no longer temporarily disabled and is disposed in the second position 46, the method 16 may include again determining 96 whether the coolant inlet temperature 72 is less than a third threshold temperature 98. That is, the method 16 may include again measuring 82 the coolant inlet temperature 72 via the at least one temperature sensor 84, and again comparing 86 the coolant inlet temperature 72 to the third threshold temperature 98 via the processor 58. The third threshold temperature 98 may likewise be determined by calibration of the fuel cell stack 14 and may represent a temperature at which the coolant is sufficiently warm enough to melt ice or to indicate that the fuel cell stack 14 is nearing nominal operation.

Finally, for the first condition 90, after determining 96 whether the coolant inlet temperature 72 is less than the third threshold temperature 98, the method 16 may include again detecting 94 via the controller 56 that the temporarily disabled drain valve 18 is disposed in the first position 44.

Referring again to the first condition 90 in which the coolant inlet temperature 72 is less than the threshold temperature 88 and when the temporarily disabled drain valve 18 is disposed in the first position 44, i.e., the temporarily disabled drain valve 18 is stuck or frozen, the method 16 may include again determining 96 whether the coolant inlet temperature 72 is less than a second threshold temperature 100. That is, the method 16 may include again measuring 82 the coolant inlet temperature 72 via the at least one temperature sensor 84, and again comparing 86 the coolant inlet temperature 72 to the second threshold temperature 100 via the processor 58. The second threshold temperature 100 may likewise be determined by calibration of the fuel cell stack 14 and may represent a temperature at which the coolant may be warm enough to melt ice or to indicate that the fuel cell stack 14 is nearing nominal operation.

In particular, the method 16 may further include, for the first condition 90, comparing 86 the coolant inlet temperature 72 to the second threshold temperature 100 via the processor 58 to define: a third condition 102 in which the coolant inlet temperature 72 is less than the second threshold temperature 100, or a fourth condition 104 in which the coolant inlet temperature 72 is greater than or equal to the second threshold temperature 100.

For the third condition 102 in which the coolant inlet temperature 72 is less than the second threshold temperature 100, the method 16 may further include reducing 106 at least one of the fuel cell stack warmup rate 62 (FIG. 1) and the fuel cell stack current density 64 (FIG. 1); increasing 78 the first pressure 22 in the anode 30 via the controller 56; decreasing 80 the second pressure 24 in the cathode 28 via the controller 56; and maintaining 68 the relative humidity 26 in the cathode 28 to less than the threshold relative humidity via the controller 56 to thereby minimize the flow of water ($H_2O$) from the cathode 28 to the anode 30 into the sump 20.

That is, to reduce a flow of water ($H_2O$) to the sump 20, the method 16 may include slowing the fuel cell stack warmup rate 62, for example by lowering a fuel cell stack warmup temperature, and/or lowering the fuel cell stack current density 64. Therefore, by performing a comparatively slower warmup at a comparatively lower fuel cell stack current density 64, water ($H_2O$) transfer from the cathode 28 to the anode 30 may be reduced. Stated differently, reducing 106 at least one of the fuel cell stack warmup rate 62 and the fuel cell stack current density 64 may include lowering the flow of water ($H_2O$) from the cathode 28 to the anode 30. Such operation while maintaining comparatively dry conditions in the fuel cell stack 14, i.e., maintaining 68 the relative humidity 26 of less than the threshold relative humidity, e.g., less than or equal to 80% or 75% or 70% or 65% or 60%, may reduce the flow of water ($H_2O$) to the sump 20 until the temporarily disabled drain valve 18 can transition to the second position 46.

In another embodiment, reducing 106 the fuel cell stack current density 64 may include increasing the fuel cell stack temperature 66 while maintaining 68 the relative humidity 26 of less than the threshold relative humidity via the controller 56. That is, the method 16 may include allowing the fuel cell stack 14 to warmup to a higher fuel cell stack temperature 66, e.g., greater than 70° C. or greater than 75° C. or greater than 80° C. or greater than 85° C. or greater than 90° C. or greater than 95° C., so that at any fuel cell stack current density 64, the relative humidity 26 may be controlled to less than the threshold relative humidity in the cathode 28, e.g., less than 95% or less than 90% or less than 85% or less than 80% or less than 75%.

For the fourth condition 104 in which the coolant inlet temperature 72 is greater than or equal to the second threshold temperature 100, the method 16 includes concurrently increasing 78 the first pressure 22 in the anode 30; decreasing 80 the second pressure 24 in the cathode 28, and maintaining 68 the relative humidity 26 of less than the threshold relative humidity in the cathode 28 as set forth above.

Referring again to FIG. 2, the fuel cell stack 14 may further include an anode water separator 21 (FIG. 1) disposed within the anode 30 and configured for separating water ($H_2O$) from the hydrogen ($H_2$) reactant feed to the anode 30. As such, the method 16 may further include, subsequent to detecting 94 via the controller 56 that the temporarily disabled drain valve 18 is stuck in the first position 44, comparing 86 a water level 74 (FIG. 1) in the anode water separator 21 to a threshold water level 110 to define: a fifth condition 112 in which the water level 74 is greater than the threshold water level 110, or a sixth condition 114 in which the water level 74 is less than or equal to the threshold water level 110. That is, the method 16 may include measuring 82 or estimating the water level 74 via the water level model or the at least one level sensor 116 (FIG. 1), and again comparing 86 the water level 74 to the threshold water level 110 via the processor 58. The water level model may be a software or calculation-based model that is capable of predicting the water level in the sump 20 according to operating conditions of the fuel cell stack 14. The threshold water level 110 may likewise be determined by calibration of the fuel cell stack 14 and may represent a maximum level of water required in the anode water separator 21 for nominal operation of the fuel cell stack 14.

If the water level 74 is greater than the threshold water level 110 such that the sump 20 risks overflowing since the temporarily disabled drain valve 18 cannot drain water ($H_2O$) from the sump 20, i.e., for the fifth condition 112, the method 16 may include decreasing 180 the fuel cell stack power output 38. That is, the fuel cell stack power output 38 may be limited to a calibrated value based on a water level model for the fuel cell stack 14. Conversely, for the sixth condition 114, the method 16 may include setting or maintaining 168 the fuel cell stack power output 38 as required by the demand or use of the device 12 or system 10.

Next, for the first condition 90 and subsequent to decreasing 180 the fuel stack current density 64, the method 16 may include comparing 86 the coolant inlet temperature 72 to the third threshold temperature 98 via the processor 58 to define: a seventh condition 118 in which the coolant inlet temperature 72 is greater than the third threshold temperature 98, or an eighth condition 120 in which the coolant inlet temperature 72 is less than or equal to the third threshold temperature 98.

For the seventh condition 118, the method 16 may include evaluating 122 whether the relative humidity 26 is less than a threshold relative humidity 138, or whether the fuel cell stack warmup rate 62 is greater than a threshold warmup rate 140. The relative humidity 26 may be measured or sensed by the at least one relative humidity sensor and the fuel cell stack warmup rate 62 may be measured or sensed by the at least one temperature sensor. Further, the threshold relative humidity 138 and the threshold warmup rate 140 may be determined by calibration of the fuel cell stack 14 and may represent a relative humidity and warmup rate required for nominal operation of the fuel cell stack 14.

If the relative humidity 26 is not less than the threshold relative humidity 138 or if the fuel cell stack warmup rate 62 is not greater than the threshold warmup rate 140, the method 16 may then again include detecting 94 whether the temporarily disabled drain valve 18 is disposed in the first position 44. However, if the relative humidity 26 is less than the threshold relative humidity 138 or if the fuel cell stack warmup rate 62 is greater than the threshold warmup rate 140, then the method 16 may include operating the fuel cell stack 14 nominally, in a nominal state 142 (FIG. 4). That is, for automotive applications, under this condition, the method 16 may include permitting the operator to drive the vehicle without restricting the fuel cell stack power output 38.

For the eighth condition 120, the method 16 may then again include detecting 94 whether the temporarily disabled drain valve 18 is disposed in the first position 44.

Referring again to the second condition 92, if the drain valve 18 is not temporarily disabled but is instead disposed in the second position 46 as desired, the method 16 may include setting or maintaining 168 the fuel cell stack power output 38 as required by the demand or use of the device 12 or system 10. In addition, for automotive applications or other applications requiring an operator, the system 10 and device 12 may include a malfunction indicator lamp signal, e.g., a check-engine light, that may warn an operator regarding a malfunction or non-nominal operating condition. However, if the temporarily disabled drain valve 18 transitions from the first position 44 to the second position 46 as desired, the method 16 may include clearing 124 or canceling the malfunction indicator lamp signal. The method 16 may then subsequently include periodically detecting 94 via the controller 56 whether the temporarily disabled drain valve 18 is disposed in the first position 44 and cannot transition to the second position 46, i.e., whether the drain valve 18 is stuck or frozen.

However, for the second condition 92, if the temporarily disabled drain valve 18 is disposed in the first position 44, the method 16 may include determining 96 whether the fuel cell stack 14 has reached a fully-warmed state 126. That is, the method 16 may include determining 96 if the fuel cell stack is sufficiently heated to enable efficient operation of the drain valve 18.

For a first state 128 in which the fuel cells stack 14 has not yet reached the fully-warmed state 126, the method 16 includes increasing 78 the first pressure 22 in the anode 30 via the controller 56, decreasing 80 the second pressure 24 in the cathode 28 via the controller 56, and maintaining 68 the relative humidity 26 of less than the threshold relative humidity in the cathode 28 via the controller 56.

Alternatively, for a second state 130 in which the fuel cell stack 14 has reached the fully-warmed state 126, the method 16 may also include sending 132 the malfunction indicator lamp signal to the operator in addition to concurrently increasing 78 the first pressure 22, decreasing 80 the second pressure 24, and maintaining 68 the relative humidity 26 of less than the threshold relative humidity in the cathode 28.

Next, for the second condition 92, the method 16 may further include, subsequent to detecting 94 via the controller 56 that the temporarily disabled drain valve 18 is stuck in the first position 44 and subsequent to determining 96 whether the fuel cell stack 14 has reached a fully-warmed state 126, comparing 86 the water level 74 in the anode water separator 21 (FIG. 1) to the threshold water level 110 to define: the fifth condition 112 in which the water level 74 is greater than the threshold water level 110, or the sixth condition 114 in which the water level 74 is less than or equal to the threshold water level 110.

If the water level 74 is greater than the threshold water level 110, i.e., for the fifth condition 112, the method 16 may include decreasing 180 the fuel cell stack power output 38. That is, the fuel cell stack power output 38 may be limited to a calibrated value based on the water level model for the fuel cell stack 14. Conversely, for the sixth condition 114, the method 16 may include setting or maintaining 168 the fuel cell stack power output 38 as required by the demand or use of the device 12 or system 10.

Therefore, the method 16 allows the fuel cell stack 14 to be operated even while the drain valve 18 is temporarily undesirably disposed in the first position 44 by increasing 78 the first pressure 22 in the anode 30, decreasing 80 the second pressure 24 in the cathode 28, and keeping the relative humidity 26 in the cathode 28 comparatively low.

In summary, the method 16 may include, concurrent to maintaining 68 the relative humidity 26 in the cathode 28, producing and sustaining 134 the fuel cell stack power output 38 sufficient to power the device 12 for the predetermined duration while the temporarily disabled drain valve 18 is disposed in the first position 44. As the fuel cell stack 14 operates, the fuel cell stack 14 may consequently heat up or warm. As such, the method 16 may further include warming 136 the temporarily disabled drain valve 18 to thereby transition the temporarily disabled drain valve 18 from the first position 44 to the second position 46. That is, as the fuel cell stack 14 warms due to continued operation, the fuel cell stack 14 may generate sufficient heat to thaw or open a frozen drain valve 18 and enable water ($H_2O$) to drain from the fuel cell stack 14.

Therefore, the method 16, system 10, and device 12 are robust and enable operation of the fuel cell stack 14 even when the temporarily disabled drain valve 18 cannot transition to the second position 46. Further, the method 16 may eliminate a need for auxiliary heaters or other components to ensure consistent valve operation. In addition, the method 16, system 10, and device 12 enable immediate use of and power generation by the fuel cell stack 14 without requiring time- and fuel-consuming warm-up periods for the fuel cell stack 14.

While the best modes for carrying out the disclosure have been described in detail, those familiar with the art to which this disclosure relates will recognize various alternative designs and embodiments for practicing the disclosure within the scope of the appended claims.

What is claimed is:

1. A method of operating a fuel cell stack to power a set of drive wheels of a vehicle, wherein the fuel cell stack includes a cathode, an anode, a sump configured for collecting water from the anode, and a temporarily disabled drain valve that is otherwise configured to transition from a first position to a second position and thereby drain water from the sump, the method comprising:
   increasing a first pressure in the anode via a controller;
   concurrent to increasing, decreasing a second pressure in the cathode via the controller; and
   concurrent to decreasing, maintaining a relative humidity of less than a threshold relative humidity in the cathode via the controller; and continually operating the fuel cell stack to transform chemical energy from an electrochemical reaction of hydrogen and oxygen to electrical energy to thereby power the set of drive wheels while the temporarily disabled drain valve is stuck in the first position and cannot drain water from the sump until the temporarily disabled drain valve transitions to the second position and drains water from the sump;

wherein the fuel cell stack further includes a polymer electrolyte membrane disposed between the cathode and the anode;

wherein the anode and the cathode each include a gas diffusion layer; and further wherein maintaining the relative humidity of less than the threshold relative humidity includes filling the polymer electrolyte membrane and the gas diffusion layer with water before adding water to the sump.

2. The method of claim 1, wherein maintaining the relative humidity of less than the threshold humidity includes minimizing an amount of water collected by the sump for a predetermined duration of from 5 minutes to 1 hour.

3. The method of claim 1, wherein increasing includes setting the first pressure to greater than the second pressure to thereby reduce a flow of water from the cathode to the anode.

4. The method of claim 1, further including, prior to increasing, detecting via the controller that the temporarily disabled drain valve is disposed in the first position and cannot transition to the second position.

5. The method of claim 1, further including, concurrent to maintaining the relative humidity of less than the threshold humidity, producing and sustaining a fuel cell stack power output sufficient to power a device for a predetermined duration of from 5 minutes to 1 hour while the temporarily disabled drain valve is disposed in the first position.

6. The method of claim 1, further including warming the temporarily disabled drain valve to thereby transition the temporarily disabled drain valve from the first position to the second position.

7. The method of claim 1, further comprising, prior to increasing:
measuring a temperature of a coolant at an inlet to the fuel cell stack via at least one temperature sensor;
comparing the temperature to a first threshold temperature via a processor to define:
a first condition in which the temperature is less than the first threshold temperature; or
a second condition in which the temperature is greater than or equal to the first threshold temperature; and
after comparing, detecting via the controller that the temporarily disabled drain valve is disposed in the first position.

8. The method of claim 7, further comprising, for the first condition, comparing the temperature to a second threshold temperature via the processor to define:
a third condition in which the temperature is less than the second threshold temperature; or
a fourth condition in which the temperature is greater than or equal to the second threshold temperature.

9. The method of claim 8, further comprising, for the third condition, reducing at least one of a fuel cell stack warmup rate and a fuel cell stack current density.

10. The method of claim 9, wherein reducing includes lowering a flow of water from the cathode to the anode.

11. The method of claim 9, wherein reducing the fuel cell stack current density includes increasing a fuel cell stack temperature while maintaining the relative humidity of less than the threshold relative humidity via the controller.

12. The method of claim 7, wherein the fuel cell stack further includes an anode water separator disposed within the anode, and wherein the method further comprises, subsequent to detecting via the controller that the temporarily disabled drain valve is disposed in the first position, measuring or estimating a water level in the anode water separator via at least one level sensor or a water level model, and comparing the water level to a threshold water level to define:
a fifth condition in which the water level is greater than the threshold water level; or
a sixth condition in which the water level is less than or equal to the threshold water level; and
for the fifth condition, decreasing a fuel cell stack power output; or
for the sixth condition, maintaining the fuel cell stack power output.

13. The method of claim 9, further comprising, for the first condition and subsequent to reducing the fuel cell stack current density, comparing the temperature to a third threshold temperature via the processor to define:
a seventh condition in which the temperature is greater than the third threshold temperature; or
an eighth condition in which the temperature is less than or equal to the third threshold temperature; and
for the seventh condition, evaluating whether:
the relative humidity is less than the threshold relative humidity; or
the fuel cell stack warmup rate is greater than a threshold warmup rate; or
for the eighth condition, detecting via the controller that the temporarily disabled drain valve is disposed in the first position.

14. The method of claim 7, further including, for the second condition, if the temporarily disabled drain valve is disposed in the first position, determining whether the fuel cell stack has reached a fully-warmed state.

* * * * *